(12) United States Patent
Koda et al.

(10) Patent No.: US 10,088,031 B2
(45) Date of Patent: Oct. 2, 2018

(54) PRESSED PULLEY

(71) Applicant: NTN CORPORATION, Osaka (JP)

(72) Inventors: Tsuyoshi Koda, Shizuoka (JP);
Tomoyoshi Izutsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/773,774

(22) PCT Filed: Mar. 12, 2014

(86) PCT No.: PCT/JP2014/056499
§ 371 (c)(1),
(2) Date: Sep. 9, 2015

(87) PCT Pub. No.: WO2014/142172
PCT Pub. Date: Sep. 18, 2014

(65) Prior Publication Data
US 2016/0017978 A1    Jan. 21, 2016

(30) Foreign Application Priority Data

Mar. 14, 2013 (JP) .................................. 2013-051746

(51) Int. Cl.
*F16H 55/36* (2006.01)
*F16H 7/20* (2006.01)
*F16H 55/44* (2006.01)

(52) U.S. Cl.
CPC .................... *F16H 55/44* (2013.01)

(58) Field of Classification Search
CPC ............. F16H 55/44; F16H 2007/0865; B21D 53/261; F16C 13/006; Y10T 29/4946
(Continued)

(56) References Cited

U.S. PATENT DOCUMENTS 1,990,805 A * 2/1935 Watson .................. B65G 39/02
193/37
2,655,813 A * 10/1953 Howell .................. F16H 55/36
29/892.11
(Continued)

FOREIGN PATENT DOCUMENTS

CN          101198803          6/2008
DE          91 01 950          6/1991
(Continued)

OTHER PUBLICATIONS

International Search Report dated Jun. 3, 2014 in International (PCT) Application No. PCT/JP2014/056499.
(Continued)

*Primary Examiner* — Henry Y Liu
(74) *Attorney, Agent, or Firm* — Wenderoth, Lind & Ponack, L.L.P.

(57) ABSTRACT

A pressed pulley includes an annular connecting portion connected to an end of the outer tubular portion around which a belt is wound and an end of the inner tubular portion. The connecting portion is an annular bent portion having a circular arc-shaped section and formed with an inner circular arc-shaped surface having a constant radius of curvature and connected to the radially inner surface of the outer tubular portion and the radially outer surface of the inner tubular portion through respective tangential lines.

7 Claims, 2 Drawing Sheets

(58) Field of Classification Search
USPC .................................................. 474/199, 166
See application file for complete search history.

(56) References Cited

U.S. PATENT DOCUMENTS

| | | | | |
|---|---|---|---|---|
| 2,741,134 A * | 4/1956 | Bagley | .................... | F16H 55/50 |
| | | | | 29/892.11 |
| 2,787,914 A * | 4/1957 | Nelson | .................... | F16H 55/44 |
| | | | | 474/168 |
| 2,906,134 A * | 9/1959 | Bagley | .................... | F16H 55/44 |
| | | | | 474/168 |
| 3,490,285 A * | 1/1970 | Donath | .................... | F16H 7/12 |
| | | | | 474/187 |
| 3,633,431 A * | 1/1972 | Van Bussel | .......... | B21D 53/261 |
| | | | | 29/892.11 |
| 3,722,310 A * | 3/1973 | Schultz, Jr. | ............. | F16H 55/44 |
| | | | | 301/64.303 |
| 3,789,683 A * | 2/1974 | Frost | ....................... | F16H 55/44 |
| | | | | 474/181 |
| 3,822,457 A * | 7/1974 | Frost | .................... | B21D 53/261 |
| | | | | 219/119 |
| 3,838,485 A * | 10/1974 | Oldford | ............... | B21D 53/261 |
| | | | | 29/417 |
| 3,848,309 A * | 11/1974 | Nuss | .................... | B21D 53/261 |
| | | | | 29/416 |
| 3,910,129 A * | 10/1975 | Phillips | ................... | F16H 55/56 |
| | | | | 474/46 |
| 3,945,102 A * | 3/1976 | Kotlar | ................... | B21D 53/261 |
| | | | | 29/892.11 |
| 3,961,538 A * | 6/1976 | Phillips | ................... | F16H 55/56 |
| | | | | 474/46 |
| 3,962,926 A * | 6/1976 | Kotlar | ................... | F16H 55/44 |
| | | | | 29/892.11 |
| 3,977,264 A * | 8/1976 | Sproul | ................... | B21D 53/261 |
| | | | | 29/892.3 |
| 3,994,181 A * | 11/1976 | Sproul | ................... | F16H 55/44 |
| | | | | 29/892.3 |
| 4,037,486 A * | 7/1977 | Schultz, Jr. | ............. | F16H 55/44 |
| | | | | 29/892.11 |
| 4,231,265 A * | 11/1980 | Hanisch | .................. | F16H 55/44 |
| | | | | 474/152 |
| 4,273,547 A * | 6/1981 | Bytzek | ................. | B21D 53/261 |
| | | | | 29/892.3 |
| 4,299,584 A * | 11/1981 | Sproul | ................... | F02B 67/06 |
| | | | | 474/135 |
| 4,443,210 A * | 4/1984 | Olschewski | .......... | F16H 7/1281 |
| | | | | 474/112 |
| 4,455,853 A * | 6/1984 | Kanemitsu | ............... | B21H 1/04 |
| | | | | 29/892.3 |
| 4,457,740 A * | 7/1984 | Olschewski | ........... | F16C 13/006 |
| | | | | 474/112 |
| 4,468,210 A * | 8/1984 | McCutchan, Jr. | ....... | F16H 55/44 |
| | | | | 474/170 |
| 4,474,562 A * | 10/1984 | Heurich | ................ | F16H 7/1281 |
| | | | | 29/517 |
| 4,516,962 A * | 5/1985 | Brandenstein | ............ | F16H 7/12 |
| | | | | 474/112 |
| 4,518,372 A * | 5/1985 | Dye | ....................... | F16C 13/006 |
| | | | | 474/199 |
| 4,518,374 A * | 5/1985 | Kanemitsu | .............. | B21D 53/261 |
| | | | | 29/892.3 |
| 4,524,595 A * | 6/1985 | Oda | ....................... | B21D 53/261 |
| | | | | 29/892.3 |
| 4,534,749 A * | 8/1985 | Hans | ...................... | F16C 13/006 |
| | | | | 474/174 |
| 4,551,122 A * | 11/1985 | Kraft | .................... | B21D 53/261 |
| | | | | 29/892.3 |
| 4,591,352 A * | 5/1986 | Olschewski | .......... | F16C 13/006 |
| | | | | 384/505 |
| 4,618,335 A * | 10/1986 | Brandenstein | ........ | F16H 7/1281 |
| | | | | 474/112 |
| 4,626,231 A * | 12/1986 | Nagano | .................. | F16D 1/076 |
| | | | | 29/465 |
| 4,631,946 A * | 12/1986 | Oda | ..................... | B21D 53/261 |
| | | | | 29/892.3 |
| 4,767,387 A * | 8/1988 | Matsuoka | ............ | B21D 53/261 |
| | | | | 474/168 |
| 4,799,909 A * | 1/1989 | Kanemitsu | ........... | B21D 53/261 |
| | | | | 474/168 |
| 4,824,422 A * | 4/1989 | Jocic | ...................... | F16H 55/44 |
| | | | | 29/892 |
| 4,824,423 A * | 4/1989 | Jocic | ...................... | F16H 55/44 |
| | | | | 474/170 |
| 4,840,607 A * | 6/1989 | Hitchcock | ............... | F16H 55/44 |
| | | | | 474/167 |
| 4,882,944 A * | 11/1989 | Vohl | ...................... | F16F 15/126 |
| | | | | 474/166 |
| D308,012 S * | 5/1990 | Kanemitsu | ................... | D8/360 |
| D308,013 S * | 5/1990 | Kanemitsu | ................... | D8/360 |
| 4,966,572 A * | 10/1990 | Kunkel | .................... | F04D 13/02 |
| | | | | 474/199 |
| D322,553 S * | 12/1991 | Kanemitsu | ................... | D8/360 |
| 5,123,166 A * | 6/1992 | Kanemitsu | ........... | B21D 53/261 |
| | | | | 29/892.3 |
| 5,188,573 A * | 2/1993 | Leicht | ..................... | F16H 55/44 |
| | | | | 474/175 |
| 5,409,423 A * | 4/1995 | Ullrich | ................ | F16F 15/1442 |
| | | | | 474/170 |
| 5,421,788 A * | 6/1995 | Toth | ...................... | F16C 13/006 |
| | | | | 474/135 |
| 5,725,448 A * | 3/1998 | Kato | ...................... | F16C 13/006 |
| | | | | 384/510 |
| 5,728,020 A * | 3/1998 | Muranaka | ............ | F16C 33/6633 |
| | | | | 384/462 |
| 6,102,822 A * | 8/2000 | Nakazeki | ............... | F16C 13/006 |
| | | | | 384/523 |
| 6,139,457 A * | 10/2000 | Kanemitsu | ............... | F16H 55/44 |
| | | | | 242/614 |
| 6,196,720 B1 * | 3/2001 | Nozaki | ................. | C10M 169/02 |
| | | | | 384/13 |
| 6,220,982 B1 * | 4/2001 | Kawashima | ........... | F16H 55/44 |
| | | | | 384/536 |
| 6,270,001 B1 * | 8/2001 | Tadic | ..................... | B23K 31/02 |
| | | | | 219/121.66 |
| 6,293,885 B1 * | 9/2001 | Serkh | .................... | F16C 13/006 |
| | | | | 474/133 |
| 6,625,887 B1 * | 9/2003 | Kanemitsu | ........... | B21D 53/261 |
| | | | | 29/892.3 |
| 6,692,393 B2 * | 2/2004 | Fukuwaka | ............ | F16C 33/416 |
| | | | | 474/135 |
| 6,875,142 B2 * | 4/2005 | Kanemitsu | ........... | B21D 53/261 |
| | | | | 29/892.3 |
| 7,055,243 B2 * | 6/2006 | Hodjat | ................. | B21D 53/261 |
| | | | | 29/892.11 |
| 8,651,988 B2 * | 2/2014 | Kapfer | .................. | F16C 13/006 |
| | | | | 474/101 |
| 8,905,879 B2 * | 12/2014 | Lannutti | ................ | F16C 13/006 |
| | | | | 384/481 |
| 2001/0053725 A1 * | 12/2001 | Hodjat | ................. | B21D 53/261 |
| | | | | 474/166 |
| 2004/0178398 A1 * | 9/2004 | Miller | ..................... | F16H 55/44 |
| | | | | 254/390 |
| 2008/0196992 A1 | 8/2008 | Ostrowski | | |
| 2008/0300077 A1 * | 12/2008 | Kapfer | .................. | F16C 13/006 |
| | | | | 474/133 |
| 2009/0191999 A1 * | 7/2009 | Joseph | .................. | F16C 13/006 |
| | | | | 474/199 |
| 2011/0039648 A1 * | 2/2011 | Lannutti | ............... | F16C 13/006 |
| | | | | 474/166 |
| 2014/0329629 A1 * | 11/2014 | Vukojicic | ............... | F16H 55/36 |
| | | | | 474/94 |

FOREIGN PATENT DOCUMENTS

| | | |
|---|---|---|
| DE | 198 00 973 | 7/1999 |
| JP | 48-41487 | 12/1973 |
| JP | 53-11446 | 1/1978 |
| JP | 59-126160 | 7/1984 |
| JP | 61-056741 | 3/1986 |

(56) References Cited

FOREIGN PATENT DOCUMENTS

| | | |
|---|---|---|
| JP | 05-076971 | 3/1993 |
| JP | 2002-5234 | 1/2002 |
| JP | 2002-250429 | 9/2002 |
| JP | 2002-349678 | 12/2002 |
| JP | 2007-198402 | 8/2007 |

OTHER PUBLICATIONS

Written Opinion of the International Searching Authority dated Jun. 3, 2014 in International (PCT) Application No. PCT/JP2014/056499 (with English translation).
Extended European Search Report dated Mar. 16, 2016 in corresponding European Application No. 14764079.1.
Office Action dated May 22, 2018 in Japanese Application No. 2017-131054, with English translation.

* cited by examiner

PRESSED PULLEY

TECHNICAL FIELD

The present invention relates to a pressed pulley formed by pressing a steel sheet.

BACKGROUND ART

The below-identified Patent documents 1 and 2 disclose pressed pulleys which are used in tensioners for engine accessory driving belts or timing belts, of automotive engines, or as idler pulleys for adjusting belt winding angles.

The pressed pulley disclosed in Patent document 1 includes a belt winding portion as an outer tubular portion around which a belt is wound, a press-fitting portion as an inner tubular portion provided inside the belt winding portion, and a side plate portion through which the belt winding portion and the press-fitting portion are coupled together. The pressed pulley is formed by pressing a steel sheet such that the winding portion and the press-fitting portion are bent in the same axial direction.

A press-fitting portion-side corner portion provided at the integral portion between the press-fitting portion and the side plate portion comprises a plurality of circular arcs having different radii of curvature such that the press-fitting portion and the arc adjacent to the press-fitting portion, the adjacent arcs, and the side plate portion and the arc adjacent to the side plate portion are connected together by tangential lines, and such that the press-fitting portion side corner portion has a larger radius of curvature. With this arrangement, it is possible to reduce stress generated in the press-fitting portion-side corner portion, thereby preventing breakage of the pulley.

On the other hand, the pressed pulley disclosed in Patent document 2 includes, as with the pressed pulley of Patent document 1, a belt winding portion as an outer tubular portion, an inner tubular portion provided inside of the outer tubular portion, and an annular flange portion (corresponding to the side plate of Patent document 1) through which the inner tubular portion and the belt winding portion are integrally coupled together. The inner tubular portion and the flange portion define a corner portion having an increased thickness so as to prevent fatigue breakage of the pulley at or around its portion when maximum stress is applied.

PRIOR ART DOCUMENTS

Patent Documents

Patent document 1: JP Patent Publication 2002-250429A
Patent document 2: JP Patent Publication 2007-198402A Either of the pressed pulleys of Patent documents 1 and 2 has the corner portion at the integral portion between the inner tubular portion and the side plate portion shaped so as to reduce stress concentration, thereby improving load resistance. However, since the side plate portion is provided between the outer tubular portion and the inner tubular portion, the inner diameter of the inner tubular portion is extremely small compared to the outer diameter of outer tubular portion, such that it is impossible to mount a large-sized bearing in the pulley. Thus, in order to increase the load resistance and thus the load capacity, of the pulley by mounting a large-sized bearing, it is necessary to increase the diameter of the outer tubular portion and thus the size of the pressed pulley.

SUMMARY OF THE INVENTION

An object of the present invention is to provide a pressed pulley including an inner tubular portion having an inner diameter smaller than that of the inner tubular portion of a conventional pulley, with the outer diameter of the outer tubular portion unchanged, whereby a large-sized bearing can be mounted, and thus high in load capacity.

In order to achieve this object, the present invention provides a pressed pulley formed by pressing and comprising an outer tubular portion configured such that a belt can be wound around the outer tubular portion, an inner tubular portion provided inside of the outer tubular portion and configured such that a bearing can be fitted in the inner tubular portion, and a connecting portion connected to an end of the outer tubular portion and an end of the inner tubular portion. The connecting portion is an annular bent portion having a circular arc-shaped section and formed, on an inner periphery thereof, with an inner circular arc-shaped surface having a constant radius of curvature and connected to a radially inner surface of the outer tubular portion such that the radially inner surface extends in a first tangential direction of the inner circular arc-shaped surface, and connected to a radially outer surface of the inner tubular portion such that the radially outer surface extends in a second tangential direction of the inner circular arc-shaped surface.

With this arrangement, the connecting portion is an annular bent portion having a circular arc-shaped section and formed, on an inner periphery thereof, with an inner circular arc-shaped surface having a constant radius of curvature and connected to a radially inner surface of the outer tubular portion such that the radially inner surface extends in a first tangential direction of the inner circular arc-shaped surface, and connected to a radially outer surface of the inner tubular portion such that the radially outer surface extends in a second tangential direction of the inner circular arc-shaped surface. As a result, it is possible to omit the side plate portion used in the pressed pulleys disclosed in Patent documents 1 and 2, which makes it possible to increase the inner diameter of the inner tubular portion without changing the outer diameter of the outer tubular portion. This in turn makes it possible to mount a large-sized bearing in the pulley and thus to increase the load capacity of the pulley.

If the radius of curvature Ri of the inner circular arc-shaped surface of the connecting portion is less than 0.2 times the wall thickness T of a steel sheet from which the pressed pulley is formed by pressing, a large pressure is needed to form the pressed pulley by pressing, which pushes up the manufacturing cost. If the radius of curvature Ri is larger than 0.5 times the wall thickness T, the inner diameter of the inner tubular portion tends to be too small to mount a large-sized bearing in the pulley, which makes it impossible to increase the load capacity. Thus, preferably, the radius of curvature Ri is within the range of 0.2 to 0.5 times the wall thickness T of the steel sheet from which the pressed pulley is formed.

Preferably, the connecting portion of the pressed pulley according to the present invention is formed with a circular arc-shaped outer side surface having a constant radius of curvature and connected to a radially outer surface of the outer tubular portion such that the radially outer surface of the outer tubular portion extends in a first tangential direction of the circular arc-shaped outer side surface, and connected to a radially inner surface of the inner tubular portion such that the radially inner surface of the inner tubular portion extends in a second tangential direction of the circular arc-shaped outer side surface. With this arrangement, since the pressed pulley can be formed easily with high dimensional accuracy, it is possible to simplify the structure of the pressing die and also to prolong the life of the pressing die.

Preferably, the pressed pulley has a wall thickness t which is within a range of 70 to 95% of the wall thickness T of a steel sheet from which the pressed pulley is formed by pressing. With this arrangement, it is possible to improve the dimensional accuracy by adding a cold ironing step. From the above description, it can also be seen that, because t=0.7T to 0.95T and (as noted above) Ri=0.2T to 0.5T, the radius of curvature Ri of the inner circular arc-shaped surface of the connecting portion is in a range of 0.21T to 0.71T (i.e., 0.20/0.95t to 0.50/0.70t).

Preferably, a steel sheet from which the pressed pulley is formed by pressing has a wall thickness t within a range of 1.6 to 4.0 mm. The pressed pulley thus formed is high in rigidity, which makes it possible to significantly increase the load capacity.

Advantages of the Invention

According to the present invention, since the outer tubular portion and the inner tubular portion are connected together by a U-shaped annular bent portion formed with an inner circular arc-shaped surface having a constant radius of curvature and connected to a radially inner surface of the outer tubular portion such that the radially inner surface extends in a first tangential direction of the inner circular arc-shaped surface, and connected to a radially outer surface of the inner tubular portion such that the radially outer surface extends in a second tangential direction of the inner circular arc-shaped surface, it is possible to increase the inner diameter of the inner tubular portion without increasing the outer diameter of the outer tubular portion. This in turn makes it possible to increase the load capacity of the pulley.

DETAILED DESCRIPTION OF THE INVENTION

Figure 1:
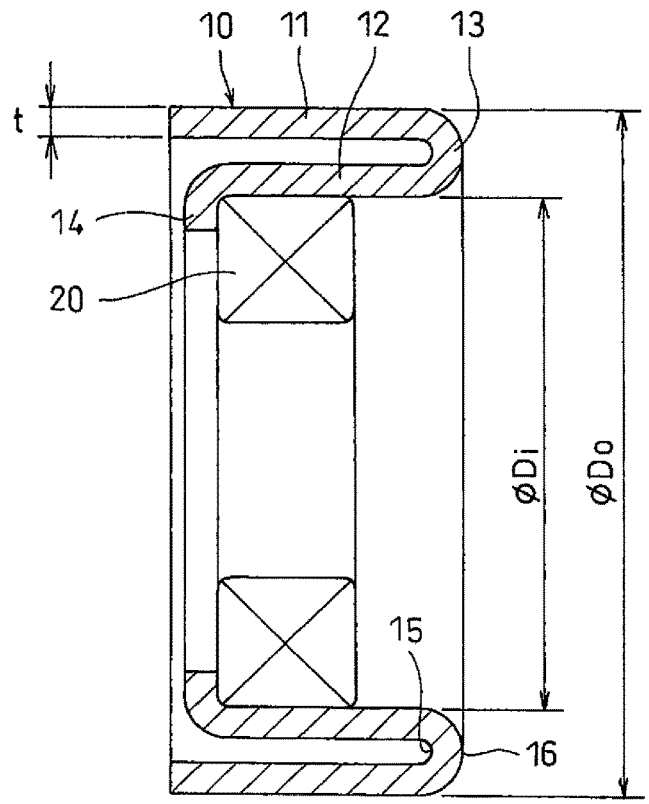
FIG. 1 is a sectional view of a pressed pulley embodying the present invention.
Figure 2:
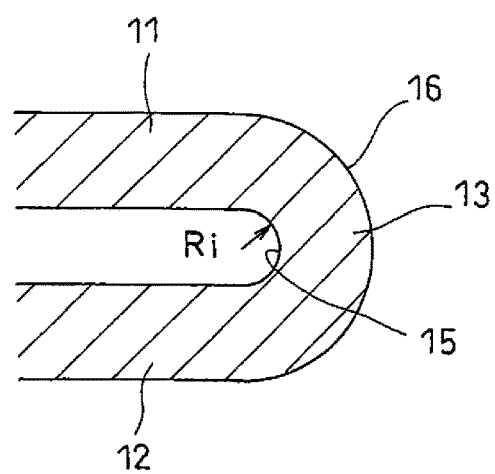
FIG. 2 is an enlarged sectional view of a portion of FIG. 1.

Now referring to the drawings, the embodiment of the present invention is described. FIGS. 1 and 2 show a pressed pulley 10 embodying the present invention. This pressed pulley 10 is formed by pressing a steel sheet, and includes an outer tubular portion 11 around which a belt is configured to be wound, an inner tubular portion 12 disposed inside the outer tubular portion 11, an annular connecting portion 13 connected to a first end of the inner tubular portion 12 and an end of the outer tubular portion 11, and an inwardly extending flange 14 formed by inwardly bending a second end of the inner tubular portion 12. By mounting a bearing 20 in the inner tubular portion 12, the pressed pulley 10 is used as a tension pulley or an idler pulley.

The connecting portion 13 is an annularly bent portion having a circular arc-shaped section and formed with an inner circular arc-shaped surface 15 having a constant radius of curvature. The inner circular arc-shaped surface 15 is connected to the radially inner surface of the outer tubular portion 11 and the radially outer surface of the inner tubular portion 12 such that the radially inner surface of the outer tubular portion 11 and the radially outer surface of the inner tubular portion 12 extend in the tangential directions of the inner circular arc-shaped surface 15.

The connecting portion 13 also has an outer circular arc-shaped surface 16 having a constant radius of curvature. The outer circular arc-shaped surface 16 is connected to the radially outer surface of the outer tubular portion 11 and the radially inner surface of the inner tubular portion 12 such that the radially outer surface of the outer tubular portion 11 and the radially inner surface of the inner tubular portion 12 extend in the tangential directions of the outer circular arc-shaped surface 16.

As shown in FIGS. 1 and 2, t indicates the thickness of the pressed pulley (e.g., the thickness of the outer tubular portion 11 of the pulley), while Ri indicates the radius of curvature of the inner circular arc-shaped surface 15. If the radius of curvature Ri of the inner circular arc-shaped surface 15 of the connecting portion 13 is unnecessarily small relative to the wall thickness t of the steel sheet to be formed into the outer tubular portion 11, inner tubular portion 12 and connecting portion 13 by pressing, it is difficult to manufacture the pressed pulley because high pressure is necessary to form the pulley by pressing. On the other hand, if the radius of curvature Ri is unnecessarily large, the inner diameter of the inner tubular portion 12 tends to be correspondingly small, which may make it impossible to mount a sufficiently large-sized bearing in the pulley. Therefore, in the embodiment, the radius of curvature Ri is set within the range of 0.2T to 0.5T (0.21t to 0.71t).

If the wall thickness T of the steel sheet to be formed into the pulley by pressing is unnecessarily small, the rigidity of the steel sheet tends to be insufficient to form a pressed pulley having a sufficiently large load capacity. If the wall thickness T is unnecessarily large, it may be impossible to press the steel sheet into the pulley. Therefore, a steel sheet having a wall thickness T within the range of 1.6 to 4.0 mm is used as the material for the pressed pulley. By forming the pressed pulley 10 from such a steel sheet, the pressed pulley 10 shows high rigidity and a large load capacity.

Figure 3:
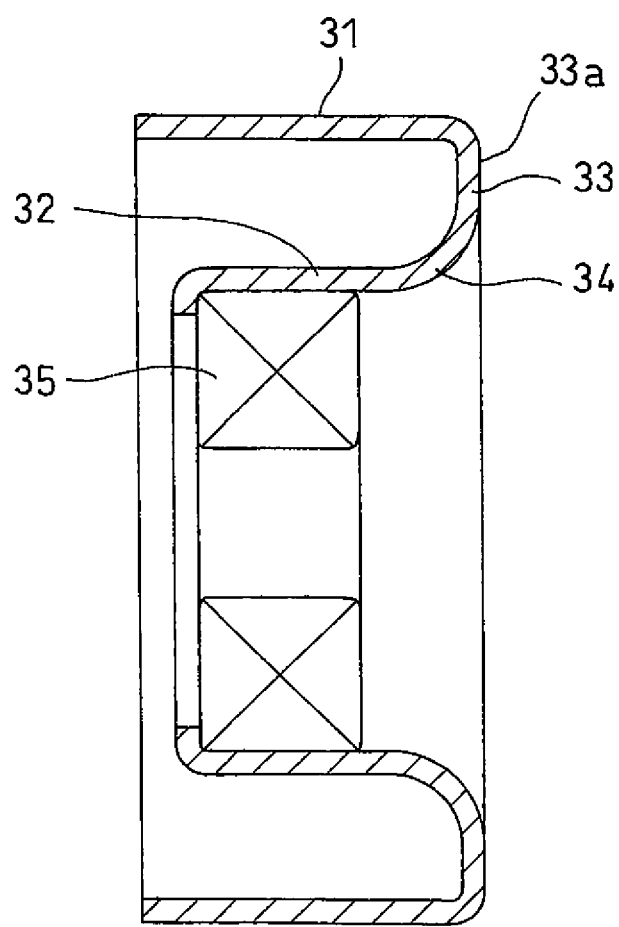
FIG. 3 is a sectional view of a conventional pressed pulley.

FIG. 3 shows a conventional pressed pulley introduced as prior art in Patent document 1. This pulley comprises an outer tubular portion 31, an inner tubular portion 32, and a connecting portion 33 through which the inner tubular portion 32 and the inner tubular portion 31 are connected together. The connecting portion 33 includes a side plate portion 33a. The side plate portion 33a and the inner tubular portion 32 define an inner tubular portion-side corner portion 34 having a constant radius of curvature and connected to the inner tubular portion 32 and the side plate portion 33a such that the inner tubular portion 32 and the side plate portion extend in the tangential directions of the corner portion 34.

In either of the pressed pulleys disclosed in Patent documents 1 and 2, the corner portion 34 defined between the inner tubular portion 32 and the side plate portion 33a is formed into a special shape to reduce stress concentration, thereby improving load resistance. Since either of the pressed pulleys has the side plate portion 33a shown in FIG. 3, as described earlier, the inner diameter of the inner tubular portion 32 is extremely small compared to the outer diameter of the outer tubular portion 31, so that it was impossible to mount a large-sized bearing 35 in the pulley.

The pressed pulley 10 shown in FIG. 1 differs from the pressed pulley shown in FIG. 3 in that the connecting portion 13 of the former, through which the outer tubular portion 11 is connected to the inner tubular portion 12, is an annular bent portion having a U-shaped section and formed with an inner circular arc-shaped side surface 15 having a constant radius of curvature and connected to the radially inner surface of the outer tubular portion 11 and the radially outer surface of the inner tubular portion 12 such that the radially inner surface of the outer tubular portion 11 and the radially outer surface of the inner tubular portion 12 extend in the tangential directions of the circular arc-shaped side surface 15, thereby omitting the side plate portion 33a of the pressed pulley shown in FIG. 3.

With this arrangement, in which the connecting portion 13 through which the outer tubular portion 11 is connected to the inner tubular portion 12 is an annular bent portion having a U-shaped section and formed with an inner circular arc-shaped side surface 15 having a constant radius of curvature and connected to the radially inner surface of the outer tubular portion 11 and the radially outer surface of the inner tubular portion 12 such that the radially inner surface of the outer tubular portion 11 and the radially outer surface of the inner tubular portion 12 extend in the tangential directions of the circular arc-shaped side surface 15, it is possible to sufficiently increase the inner diameter Di of the inner tubular portion 12 without increasing the outer diameter Do of the outer tubular portion 11, which makes it possible to mount a large-sized bearing 20, which in turn increases the load capacity of the pressed pulley.

As in the embodiment, by providing the connecting portion 13 with an outer circular arc-shaped side surface 16 having a constant radius of curvature and connected to the radially outer surface of the outer tubular portion 11 and the radially inner surface of the inner tubular portion 12 such that the radially outer surface of the outer tubular portion 11 and the radially inner surface of the inner tubular portion 12 extend in the tangential directions of the circular arc-shaped side surface 16, it is possible to easily improve the dimensional accuracy of the pressed pulley, which makes it possible to simplify the structure of the pressing die, and also prolong the life of the pressing die.

In the embodiment, after pressing, the pressed pulley 10 is subjected to a cold ironing step in which the wall thicknesses of various portions of the pressed pulley 10, such as the outer tubular portion 11 and the inner tubular portion 12, are reduced to 70 to 95% of the wall thickness T of the steel sheet to be formed into the pressed pulley. During the ironing step, it is possible to improve the dimensional accuracy of the pressed pulley 10.

DESCRIPTION OF THE NUMERALS

11. Outer tubular portion
12. Inner tubular portion
13. Connecting portion
15. Inner circular arc-shaped surface
16. Outer circular arc-shaped surface

What is claimed is:

1. A pressed pulley comprising:
    an outer tubular portion configured such that a belt can be wound around the outer tubular portion;
    an inner tubular portion inside of the outer tubular portion and configured such that a bearing can be fitted in the inner tubular portion such that an outer diameter of the bearing is at least as large as an inner diameter of the inner tubular portion; and
    a connecting portion directly connected to an end of the outer tubular portion and directly connected to an end of the inner tubular portion,
    wherein the connecting portion is an annular bent portion having a circular arc-shaped cross-section, an inner periphery of the connecting portion having an inner circular arc-shaped surface having a constant radius of curvature and directly connected to a radially inner surface of the outer tubular portion such that the radially inner surface extends in a first tangential direction of the inner circular arc-shaped surface, and directly connected to a radially outer surface of the inner tubular portion such that the radially outer surface extends in a second tangential direction of the inner circular arc-shaped surface; and
    wherein the radius of curvature of the inner circular arc-shaped surface of the connecting portion is 0.21 to 0.71 times a wall thickness of the outer tubular portion, and a steel sheet from which the pressed pulley is formed by pressing has a wall thickness within a range of 1.6 to 4.0 mm.

2. The pressed pulley of claim 1, wherein the connecting portion has a circular arc-shaped outer side surface having a constant radius of curvature and directly connected to a radially outer surface of the outer tubular portion such that the radially outer surface of the outer tubular portion extends in a first tangential direction of the circular arc-shaped outer side surface, and directly connected to a radially inner surface of the inner tubular portion such that the radially inner surface of the inner tubular portion extends in a second tangential direction of the circular arc-shaped outer side surface.

3. The pressed pulley of claim 1, wherein the pressed pulley has a wall thickness which is within a range of 70 to 95% of a wall thickness of a steel sheet from which the pressed pulley is formed by pressing.

4. The pressed pulley of claim 1, wherein an entirety of the radially outer surface of the inner tubular portion extends in the second tangential direction of the inner circular arc-shaped surface.

5. The pressed pulley of claim 1, wherein the inner tubular portion is parallel to the outer tubular portion.

6. The pressed pulley of claim 1, wherein the end of the inner tubular portion directly connected to the connecting portion is a first end, the inner tubular portion having an open, unconnected second end opposite the first end.

7. The pressed pulley of claim 6, wherein the open, unconnected second end of the inner tubular portion is formed as an inwardly-projecting flange.

* * * * *